Jan. 17, 1956 V. R. DRUM 2,731,261
CONNECTING MEANS BETWEEN WINDOW AND ACTUATOR
Filed July 22, 1953 2 Sheets-Sheet 1
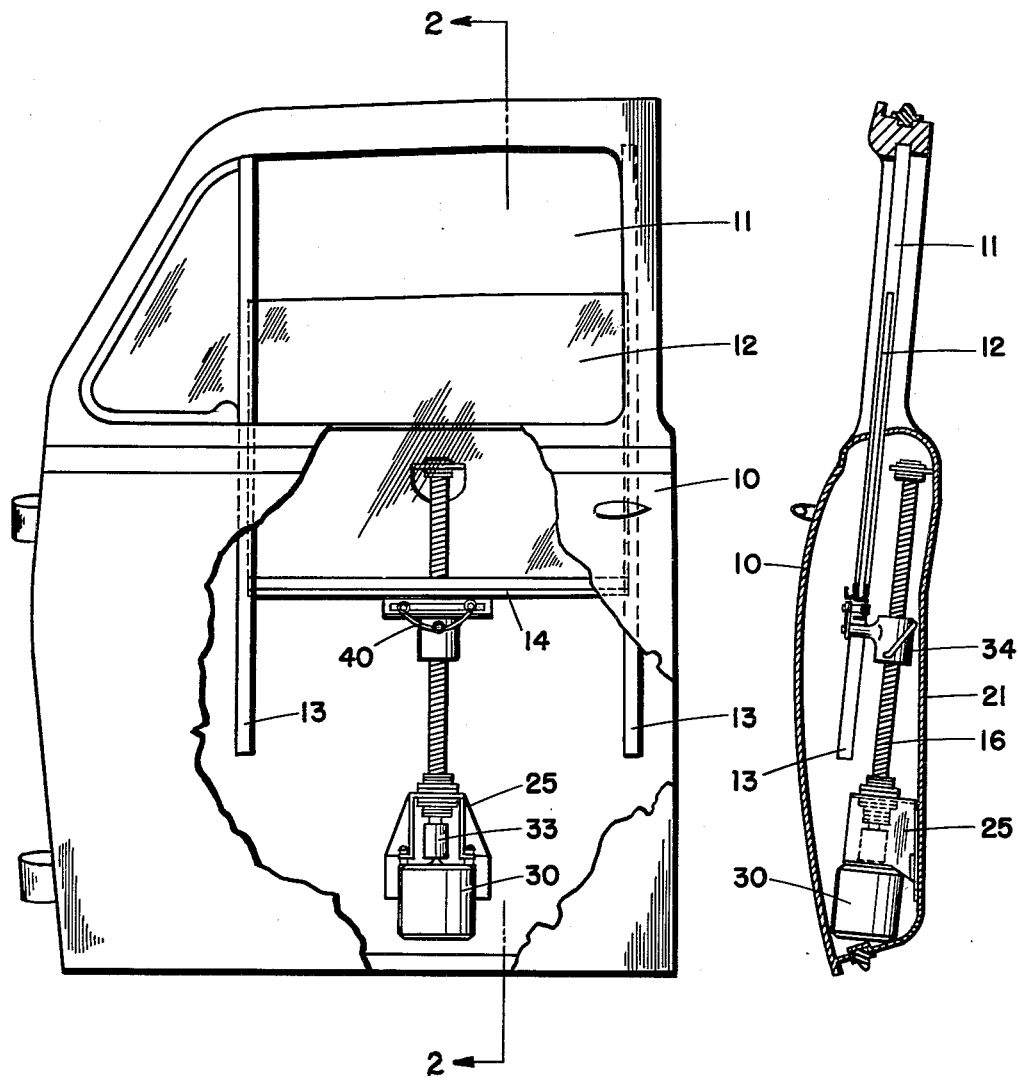
FIG. I  FIG. 2
INVENTOR.
VERN R. DRUM
BY
ATTORNEY

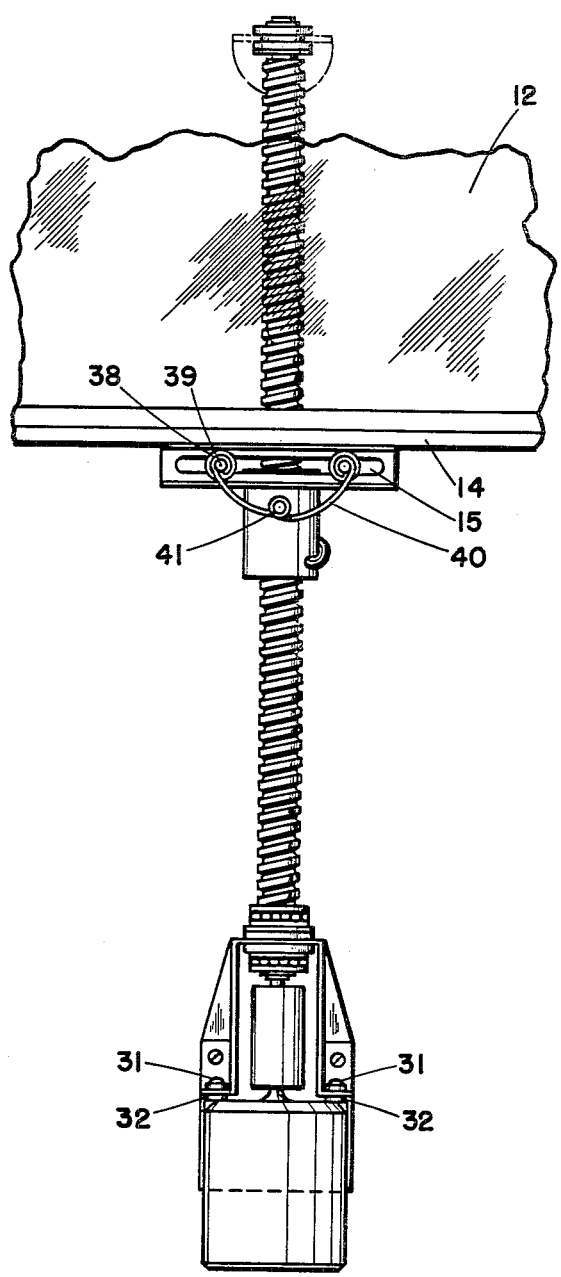
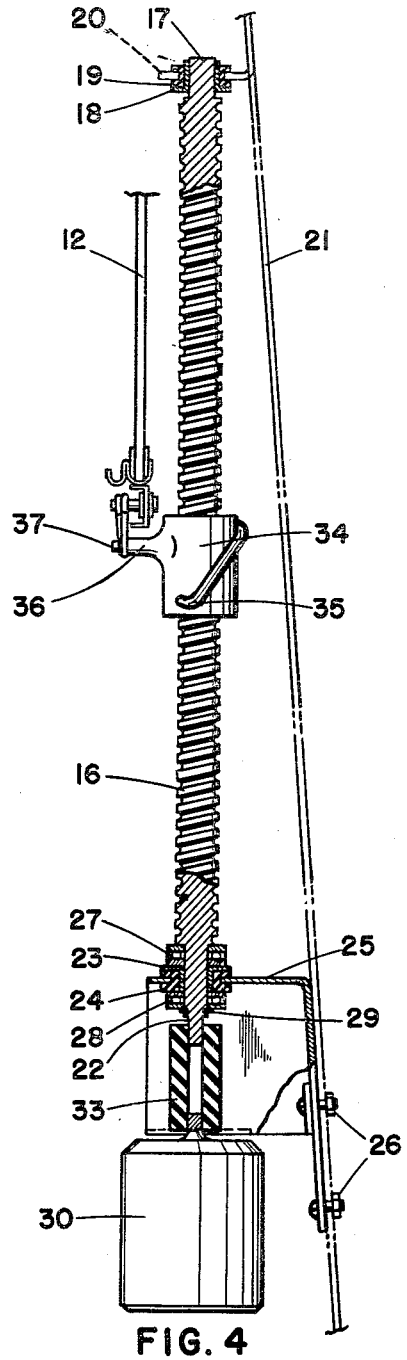
FIG. 3
FIG. 4
INVENTOR.
VERN R. DRUM
BY
ATTORNEY

United States Patent Office 2,731,261
Patented Jan. 17, 1956

2,731,261

CONNECTING MEANS BETWEEN WINDOW AND ACTUATOR

Vern R. Drum, Cleveland, Ohio, assignor to The Cleveland Pneumatic Tool Company, Cleveland, Ohio, a corporation of Ohio Application July 22, 1953, Serial No. 369,675

2 Claims. (Cl. 268—124)

This invention relates broadly to window actuating mechanisms, but more particularly to such power actuating mechanisms especially suitable, but not necessarily limited, to the opening and closing of automobile windows and of other self-propelled vehicles.

Power operated automobile window actuators now available are designed to give a maximum thrust, up or down, of about twenty-seven pounds, which thrust has been found necessary to move the windows under icy or other adverse conditions. However, this relatively high thrust could be painful or dangerous to children getting their hands or heads caught in the window.

It is therefore one object of this invention to provide an electro-mechanical window actuator designed to produce a relatively high thrust, with cushioning means intended to temporarily absorb the driving energy whenever restrictions are placed upon the upward travel of the window, thereby retarding temporarily its closing movement and enabling accidentally caught fingers or hands to be removed therefrom before being painfully pinched under the full upward thrust of the window.

Another object of this invention is to produce a power actuated automobile window operating device that is positive in action, susceptible of convenient and positive controls, easily installed, relatively simple, economical to manufacture and of general superiority and serviceability.

Other objects of this invention will be apparent from the following detailed description wherein similar characters of reference designate corresponding parts, and wherein:

Figure 1 is a front elevational view of an automobile door, with the front panel thereof partly removed, illustrating a practical application of the invention.

Figure 2 is a longitudinal sectional view taken on line 2—2 in Figure 1, and looking in the direction of the arrows.

Figure 3 is an enlarged view of the device as shown in Figure 1, and Figure 4 is an enlarged view of the device as shown in Figure 2.

Referring to the drawings, 10 designates an automobile door having a window opening 11 and a pane, hereinafter called window 12, running in parallel channels 13 fixed to the door. As is customary in automobiles, the window 12 is frameless except for a slotted metal runner 14 fixed to its lower side, with its slot 15 extending longitudinally thereof.

A ball-screw 16 is mounted, substantially vertically, between the inner and outer panels of the door 12. Its upper shafted end 17 is journaled in a bearing 18 fixed within a resilient bushing 19, which is carried by a bracket 20 extending laterally inward from the inner door panel 21. Commercially, the bracket 20 is preferably punched out of the door panel 21.

The lower shafted end 22 of the screw is similarly journaled in a bearing 23, fixed within a resilient bushing 24, which is carried by a bracket 25 extending laterally inward from the inner door panel where it is attached by such means as bolts 26. The axial thrust of the screw is taken by the lower bracket 25 through the agency of upper and lower thrust bearings 27 and 28, the upper one being located between the inner end of the shafted portion 22 and the bearing 23, while the lower one is retained against bearing 23 by a spring clip 29.

A small reversible electric motor 30 is also fixed to the bracket 25 by bolts 31 extending through resilient bushings 32. The motor is below the screw but axially aligned therewith and operatively connected thereto by a resilient coupling 33.

A nut 34 is operatively mounted on the screw 16 for longitudinal movement thereon upon its rotation in one or the other direction. The nut is preferably of the free running ball type, that is, its threads together with the threads of the screw define helical channels filled with balls carried by the nut, and returned from one to the other end thereof, through a return tube 35. A stud 36 extends radially, as an integral part of the nut 34, and is ended by a reduced terminal 37. Mounted within the slot 15 of the window runner 14, are two resilient bushings 38 designed to fit over the runner against accidental removal therefrom, but relatively free to move longitudinally in the slot 15. The bushings carry two pins 39 fixed therein, to which are attached the free ends of a leaf spring 40, which spring has a central or apex loop 41 fitted over the reduced terminal 37 of the stud 36.

As clearly shown in Figures 2 and 4, the window 12 is substantially parallel to but offset from the axis of the screw 16, thereby resulting in a bending moment applied to the screw 16, which is transmitted as a radial thrust to the terminal bearings 18 and 23. Since these bearings are not of the anti-friction type, sufficient friction is created to prevent rotation of the screw by virtue of the weight of the window on the nut 34, or by application of any force on the window 12. The greater the force applied on the window, the greater the radial thrust and consequential friction of the screw within the terminal bearings 18 and 23.

Commercially the reversible motor 30 is connected to the electric power source of the vehicle, such as its battery, and controlled by appropriate switches for imparting rotation to the screw 16 in one or the other direction and effecting up or down movement of the nut 34, which movement is transmitted to the window 12 through the spring 40. In static position, the free ends of the spring 40 are spaced from the ends of the slot 15 substantially as shown in Figure 3, and remain in that position during the normal upward or closing movement of the window. However, when any restriction is placed on the upward travel of the window, such as a child's hand accidentally caught therein, the spring 40, subjected to additional thrust, will flex to cause longitudinal displacement of its free ends and pins 39 in the slot 15 of the window runner 14. In this instance, the upward travel of the window is temporarily retarded until the free ends of spring 40 reach the ends of slot 15, thereby enabling the child's hand to be withdrawn from the window before being more painfully pinched under the full upward thrust of the window after full deflection of the spring. Since the thrust needed normally to close the window need not exceed ten pounds, the spring 40 is preferably designed to flex and absorb energy in excess of ten pounds. With such safety device, a hand accidentally caught between the upper end of the window and the window frame, is first subjected to a relatively light squeeze, which, while not painful, is sufficient to create a reflex action and instantaneous withdrawal of the hand from the window.

From the foregoing description, it will be understood that under certain conditions of operation, that is when any restriction is placed on the upward travel of the window, the nut 34 will move upwardly relative to the window while the ends of spring 40 will move longitudinally within the slot 15. This relative movement will continue until the ends of the spring reach the ends of the slot to again transmit longitudinal movement to the window.

The details of structure and arrangement of parts shown and described may be variously changed and modified without departing from the spirit and scope of the invention.

I claim:

1. In a device of the character described, a substantially vertical screw adapted to rotate on its own axis, supporting means for the ends of said screw, a reversible motor connected to said screw for imparting rotary motion thereto in either direction, a nut operatively engaging said screw for up and down movement thereon upon said rotary motion, a window movable up and down with said nut, a runner fixed to the lower side of said window, a leaf spring connected at its apex to said nut, and means connecting the free ends of said spring to said runner for lengthwise movement relative thereto.

2. In a device of the character described, a substantially vertical screw adapted to rotate on its own axis, supporting means for the ends of said screw, a reversible motor connected to said screw for imparting rotary motion thereto in either direction, a nut operatively engaging said screw for up and down movement thereon upon said rotary motion, a window movable up and down with said nut, a runner fixed to the lower side of said window, a leaf spring normally transmitting the up and down movement of said nut to said window, said spring adapted to flex under certain conditions of operation, means connecting the apex of said spring to said nut, and means connecting the free ends of said spring to said runner for lengthwise movement relative thereto upon flexing of said spring.

References Cited in the file of this patent

UNITED STATES PATENTS

| | | |
|---|---|---|
| 1,388,252 | Gouin | Aug. 23, 1921 |
| 2,124,037 | Lavigne | July 19, 1938 |
| 2,314,970 | Coleman | Mar. 30, 1943 |

FOREIGN PATENTS

| | | |
|---|---|---|
| 550,807 | France | Dec. 21, 1922 |